(12) United States Patent
Beddis

(10) Patent No.: US 8,065,217 B2
(45) Date of Patent: *Nov. 22, 2011

(54) REAL-TIME PORTFOLIO BALANCING AND/OR OPTIMIZATION SYSTEM AND METHOD

(75) Inventor: Mark Beddis, West Vancouver (CA)

(73) Assignee: Bids Trading, L.P., New York, NY (US)

( * ) Notice: Subject to any disclaimer, the term of this patent is extended or adjusted under 35 U.S.C. 154(b) by 316 days.

This patent is subject to a terminal disclaimer.

(21) Appl. No.: 12/370,277

(22) Filed: Feb. 12, 2009

(65) Prior Publication Data

US 2009/0210354 A1 Aug. 20, 2009

Related U.S. Application Data

(60) Provisional application No. 61/027,928, filed on Feb. 12, 2008.

(51) Int. Cl.
*G06Q 40/00* (2006.01)
(52) U.S. Cl. .............. 705/36 R; 705/37; 705/38; 705/39
(58) Field of Classification Search ................ 705/36 R, 705/37, 38, 39
See application file for complete search history.

(56) References Cited

U.S. PATENT DOCUMENTS

| | | | |
|---|---|---|---|
| 3,573,747 A | 4/1971 | Adams et al. |
| 4,412,287 A | 10/1983 | Braddock, III |
| 5,077,665 A | 12/1991 | Silverman et al. |
| 5,101,353 A | 3/1992 | Lupien et al. |
| 5,136,501 A | 8/1992 | Silverman et al. |
| 5,195,031 A | 3/1993 | Ordish |
| 5,375,055 A | 12/1994 | Togher et al. |
| 5,727,165 A | 3/1998 | Ordish et al. |
| 5,732,400 A | 3/1998 | Mandler et al. |
| 5,924,082 A | 7/1999 | Silverman et al. |
| 6,131,087 A | 10/2000 | Luke et al. |
| 6,311,178 B1 | 10/2001 | Bi et al. |
| 6,332,135 B1 | 12/2001 | Conklin et al. |
| 6,336,105 B1 | 1/2002 | Conklin et al. |
| 6,338,050 B1 | 1/2002 | Conklin et al. |
| 6,418,419 B1 | 7/2002 | Nieboer et al. |

(Continued)

FOREIGN PATENT DOCUMENTS

CA 2197768 2/1996

(Continued)

OTHER PUBLICATIONS

International Search Report and Written Opinion, International Patent Application No. PCT/US09/33921, mailed Apr. 8, 2009 (9 pages).

(Continued)

*Primary Examiner* — Mary Cheung
*Assistant Examiner* — Daniel L Greene
(74) *Attorney, Agent, or Firm* — Wilmer Cutler Pickering Hale and Dorr LLP

(57) ABSTRACT

A computer-implemented system and method are described for real-time portfolio balancing and/or optimization of portfolio holdings, preferably in Alternative Trading Systems (ATSs), that reduces execution risk and legging risk. The computer-implemented system and method also incorporate cash constraints to assist in reducing execution risks. A computer-implemented system and method include advantages such as exposure to broad market liquidity throughout the trading day, being dynamic so that a strategy can be adjusted depending on market conditions, the reduction of execution and legging risks, optimal fills, and limited market impact.

25 Claims, 2 Drawing Sheets

200

| 202 — | Old Portfolio | | | 220 — | New Portfolio | | |
|---|---|---|---|---|---|---|---|
| | Security | Volume | Bid Price | | Security | Volume | Offer Price |
| 204 — | ABC | 50K | 27.10 | 222 — | MNO | 70K | 15.30 |
| 206 — | DEF | 25K | 10.20 | 224 — | PQR | 30K | 8.30 |
| 208 — | GHI | 50K | MPM | 226 — | STU | 40K | 65.20 |
| 210 — | JKL | 75K | 30.60 | 228 — | VWX | 80K | 28.30 |

U.S. PATENT DOCUMENTS

| | | |
|---|---|---|
| 6,496,851 B1 | 12/2002 | Morris et al. |
| 6,519,574 B1 | 2/2003 | Wilton et al. |
| 6,704,716 B1 | 3/2004 | Force |
| 6,996,541 B2 | 2/2006 | Togher et al. |
| 7,024,387 B1 | 4/2006 | Nieboer et al. |
| 7,033,488 B2 | 4/2006 | Rockwell |
| 7,035,819 B1 | 4/2006 | Gianakouros et al. |
| 7,136,834 B1 | 11/2006 | Merrin et al. |
| 7,165,044 B1 | 1/2007 | Chaffee |
| 7,412,414 B2 | 8/2008 | Michaud et al. |
| 7,415,432 B1 | 8/2008 | Gianakouros et al. |
| 7,444,300 B1 | 10/2008 | Broms et al. |
| 7,890,417 B2 | 2/2011 | Hanson et al. |
| 2001/0047332 A1 | 11/2001 | Gonen-Friedman et al. |
| 2001/0051909 A1 | 12/2001 | Keith |
| 2002/0005827 A1 | 1/2002 | Kobayashi |
| 2002/0007337 A1 | 1/2002 | Schade et al. |
| 2002/0010672 A1 | 1/2002 | Waelbroeck et al. |
| 2002/0016976 A1 | 2/2002 | Shokat |
| 2002/0052825 A1 | 5/2002 | Bensemana |
| 2002/0055901 A1 | 5/2002 | Gianakouros et al. |
| 2002/0169706 A1 | 11/2002 | Chandra et al. |
| 2003/0004859 A1 | 1/2003 | Shaw et al. |
| 2003/0046217 A1 | 3/2003 | Deaderick et al. |
| 2003/0061069 A1 | 3/2003 | Silverman et al. |
| 2003/0088499 A1 | 5/2003 | Gilbert et al. |
| 2003/0120585 A1 | 6/2003 | Rosenblatt |
| 2003/0204467 A1 | 10/2003 | Kartha et al. |
| 2004/0034591 A1 | 2/2004 | Waelbroeck et al. |
| 2004/0054612 A1 | 3/2004 | Ocampo |
| 2004/0059666 A1 | 3/2004 | Waelbroeck et al. |
| 2004/0128219 A1 | 7/2004 | Hilton |
| 2004/0153392 A1 | 8/2004 | West et al. |
| 2004/0153394 A1 | 8/2004 | West et al. |
| 2004/0177025 A1 | 9/2004 | Spoonhower et al. |
| 2004/0181479 A1 | 9/2004 | Zosin et al. |
| 2004/0193525 A1 | 9/2004 | Huang |
| 2004/0210511 A1 | 10/2004 | Waelbroeck et al. |
| 2004/0254875 A1 | 12/2004 | Byde et al. |
| 2005/0010516 A1 | 1/2005 | Ivanov et al. |
| 2005/0049952 A1 | 3/2005 | Carter |
| 2005/0108125 A1 | 5/2005 | Goodwin et al. |
| 2005/0154662 A1 | 7/2005 | Langenwalter |
| 2005/0187858 A1 | 8/2005 | Graham et al. |
| 2005/0246261 A1 | 11/2005 | Stevens et al. |
| 2005/0283426 A1 | 12/2005 | Krishnasami et al. |
| 2005/0289039 A1 | 12/2005 | Greak |
| 2006/0047598 A1 | 3/2006 | Hansen |
| 2006/0059082 A1 | 3/2006 | Silverman et al. |
| 2006/0184438 A1 | 8/2006 | McDow |
| 2006/0224587 A1 | 10/2006 | Zamir et al. |
| 2007/0055607 A1 | 3/2007 | Wunsch et al. |
| 2007/0088655 A1 | 4/2007 | Seilern |
| 2007/0130043 A1 | 6/2007 | O'Shaughnessy et al. |
| 2007/0192223 A1 | 8/2007 | Cifrese et al. |
| 2007/0299758 A1 | 12/2007 | Zosin et al. |
| 2008/0077539 A1 | 3/2008 | Drain |
| 2008/0162377 A1 | 7/2008 | Pinkas |
| 2008/0183638 A1 | 7/2008 | Chigirinskiy et al. |

FOREIGN PATENT DOCUMENTS

| | | |
|---|---|---|
| CA | 2338145 | 11/2000 |
| CA | 2377481 | 1/2001 |
| CA | 2381174 | 2/2001 |
| CA | 2386121 | 4/2001 |
| CA | 2389828 | 5/2001 |
| CA | 2383113 | 12/2001 |
| CA | 2477742 | 9/2003 |
| CA | 2394967 | 12/2003 |
| CA | 2504600 | 5/2004 |
| CA | 2530714 | 2/2005 |
| EP | 0399850 | 11/1990 |
| EP | 0407026 | 1/1991 |
| EP | 0416482 | 3/1991 |
| EP | 0434224 | 6/1991 |
| EP | 0491455 | 6/1992 |
| GB | 2294788 | 5/1996 |
| JP | 5314139 | 11/1993 |
| JP | 2000172761 | 6/2000 |
| WO | WO-97/22075 | 6/1997 |
| WO | WO-9722072 | 6/1997 |
| WO | WO-02/095638 | 11/2002 |
| WO | WO-2007/112085 | 10/2007 |

OTHER PUBLICATIONS

International Search Report for International Patent Application No. PCT/US08/52723, dated May 21, 2008, 2 pages.

REAL-TIME PORTFOLIO BALANCING AND/OR OPTIMIZATION SYSTEM AND METHOD

RELATED APPLICATIONS

The present application claims priority to provisional application 61/027,928 filed Feb. 12, 2008.

FIELD OF THE INVENTION

The present invention relates to computer-implemented systems and methods that are used in association with the operation of alternative trading systems (ATSs) for trading securities. More specifically, the present invention relates to computer-implemented systems and methods that are used in association with the operation of ATSs for trading large blocks of securities, and the periodic balancing of portfolios of ATS users.

BACKGROUND OF THE INVENTION

It is commonplace for broker/dealers and institutional investors (collectively "Traders") to desire to trade large blocks of securities. This provides the ability to take advantage of market realities and hopefully maximize profits for their clients. Whether the Trader is acting for a buyer or seller, there is a strong desire to be able to trade anonymously so that his/her identity or trading intentions as a buyer or seller will not affect transaction pricing. Anonymity is also very important in the large block trading environment because there may not be a single entity with which to transact such large block trades and it may have to be split up among a number of buying or selling entities.

It has been known in a number of trading environments to periodically rebalance portfolio holdings to meet desired investing strategies. In many cases, this rebalancing would be based on weighting factors for the portfolio holding or in the case of a stock index, the proportional value of each stock with respect to the whole index. This periodic rebalancing of a portfolio can take place, for example, on a daily, weekly, monthly semiannual or annual basis.

Whenever there is rebalancing, there is always high execution risk in transitioning from desired old portfolio holdings to desired new portfolio holdings. This high execution risk dictates a desire to buy and sell the securities to effect such a transition within a relatively short time period. This execution risk may be in the form of price changes between the time the order is made and executed. Further, if the transaction is not executed in a relatively short period of time, there also can be considerable risk by the portfolio manager in the form of "legging risk," which is that one of the "legs" in an investing strategy will not be filled. Therefore, it is highly preferred to reduce or eliminate these risks through simultaneous buys and sells for transitioning from desired old to new portfolio holding in the rebalancing process.

At present, there are two main forms of "portfolio rebalancing" also referred to as "portfolio balancing". The first type is crossing systems that are deployed in periodic call auctions. Examples of a crossing systems are NYSE MatchPoint™ and NASDAQ Crossing Network™. The second type is algorithms operating in real-time throughout the trading day that effect portfolio balancing. These algorithms may be in the form of toolkits provided to broker/dealers for executing rebalancing strategies.

Strengths of crossing networks include (i) the seeming elimination of execution risk by pooling all orders into a single netting process; (ii) permitting optimal fills such that every trade that can be done, will be done within the call auction; (iii) and limiting market impact. Some weaknesses of crossing networks are they have (i) only limited market exposure by only accessing liquidity during the cross itself and (ii) limited location exposure such that there is no access to other liquidity sources during the cross. These weaknesses outweigh the strengths such that crossing systems do not provide a very attractive solution for portfolio balancing in the ATS environment.

Strengths of algorithms or "algos" include (i) exposure to broad market liquidity throughout the trading day and (ii) being dynamic, such that they can adjust their strategies depending in market conditions. Weaknesses of algos include (i) severe constraints on execution size, which means that they cannot exploit every market opportunity for fear of violating cash limits and/or risk limits and (ii) some market impact because certain transaction patterns may be visible. Again, the weaknesses outweigh the strengths such that algos also do not provide an attractive solution for portfolio balancing in the ATS environment.

The prior art systems and methods do not provide attractive methods for carrying out portfolio balancing in an ATS environment. The present invention overcomes the problems of the prior art systems as will be described subsequently.

SUMMARY OF THE INVENTION

The present invention is a computer-implemented system and method for real-time portfolio balancing and/or optimization of portfolio holdings that reduces or eliminates at least execution risk and legging risk associated with these executions. This computer implemented system and method do so by substantially reducing the portfolio balancing and/or optimization time to a relatively short period of time for each transaction in the balancing and/or optimization process. The execution risk also is reduced or eliminated by this system and method of the present invention employing predetermined cash constraints for balancing transactions. A system and method of the present invention include advantages such as exposure to broad market liquidity throughout the trading day, being dynamic so that a strategy can be adjusted depending on market conditions, the reduction or elimination of execution legging risks, optimal fills, and limited market impact.

In the computer-implemented system and method of the present invention, the system user, such as a Trader, who desires to balance and/or optimize certain holdings of his/her portfolio will upload, preferably to the ATS system, certain desired current portfolio holdings and the desired new portfolio holdings at the portfolio balancing event time. The ATS system will monitor its internal order book to seek out trading opportunities that fit the execution requirements. When opportunities arise, the computer-implemented system and method of the present invention will anonymously automatch and execute trades. In carrying out these trade executions, the system and method of the present invention will lock the order book for each symbol in the transaction to guarantee execution. Once all of the trades are carried out to transition from the desired old portfolio holdings to those of the desired new portfolio holdings, the real-time portfolio balancing and/or optimization process is terminated until the next real-time portfolio balancing and/or optimization event time.

Real-time Portfolio balancing and/or optimization according to the system and method of the present invention may be carried out at predetermined times during the trading day. For example, a Trader may carry out real-time portfolio balancing and/or optimization hourly, at the beginning of the trading day, at the end of the trading day, or other desired times. Other desired times for real-time portfolio balancing and/or optimization include on a weekly, a monthly, a semiannual, or an annual basis. Real-time Portfolio balancing and/or optimization may also be carried out at Trader-specified times, which does not have to be on a scheduled basis.

The computer implemented system and method of the present invention will be described in greater detail in remainder of the specification with reference to the drawings.

DESCRIPTION OF THE PRESENT INVENTION

The present invention is a computer-implemented system and method for real-time portfolio balancing and/or optimization of portfolio holdings that at least reduces or eliminates execution risk and legging risk associated with real-time portfolio balancing and/or optimization. For purposes of describing the present invention, hereinafter "portfolio balancing and/or optimization" shall be referred to as "portfolio balancing." To substantially eliminate these risks, the system and method of the present invention reduces the transaction time for effecting each real-time portfolio balancing trading transaction by locking for a very short period of time, all processes in the ATS until the transactions are executed. This short period of time is less than 1 millisecond and preferably less than 10 microseconds. Even more preferably, it will be only a few microseconds. The execution risk is further reduced by employing predetermined cash constraints with respect to each balancing transaction. The cash constraints limit each transaction such that the net value of the purchases and sales associated with a real-time portfolio balancing transaction cannot exceed these constraints. That is, the net long or net short value of a transaction cannot exceed the cash constraints. Further, the present invention incorporates risk limits that relate to the concentration of risk in one or more symbols of the portfolio holdings. These risk limits enable the trader to define the greatest percentage of the portfolio that can be allocated to one security or group of securities within the portfolio.

Figure 1:
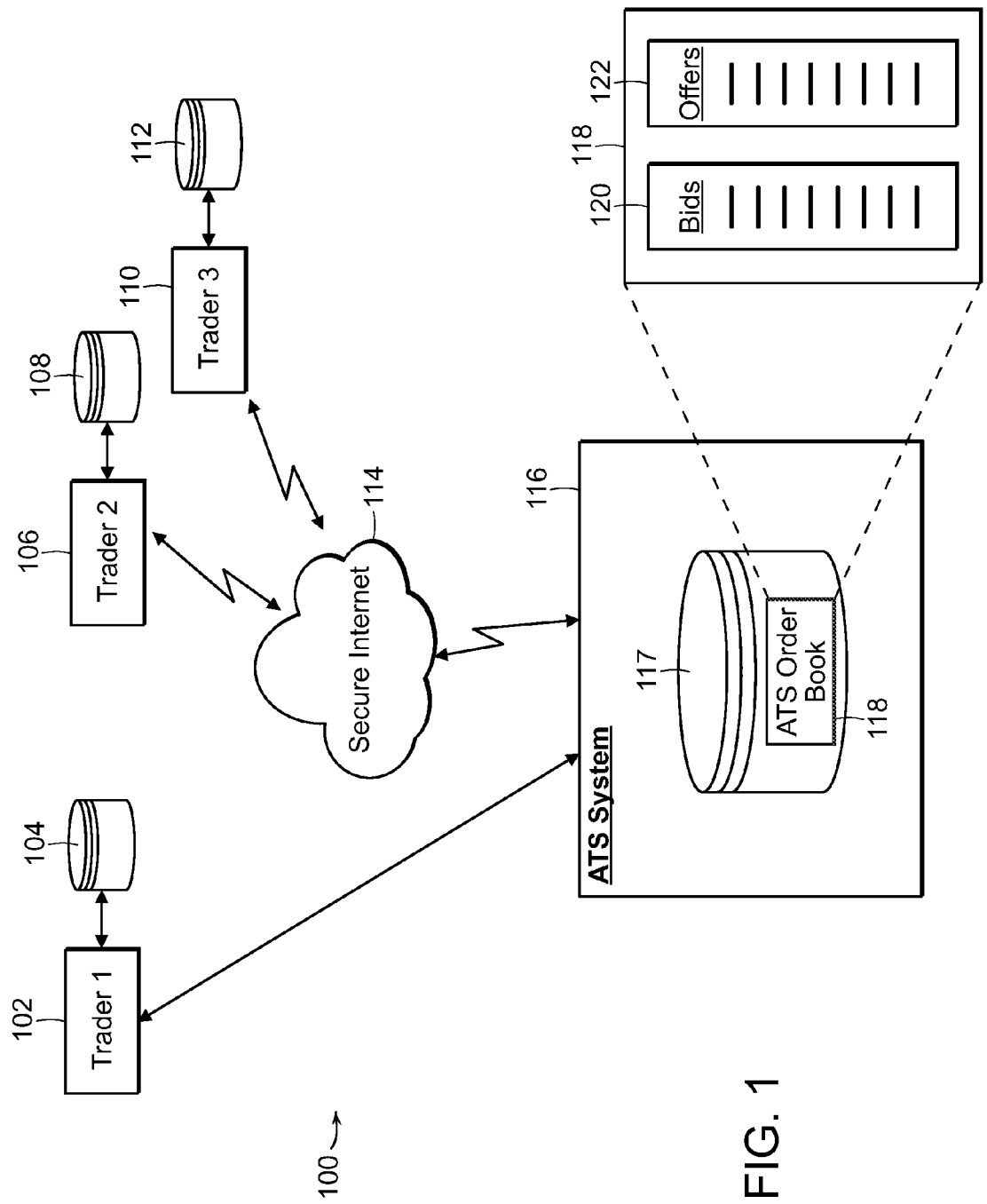
FIG. 1 shows a representative block diagram of an ATS system that can implement the present invention.

Referring to FIG. 1, generally at 100, a simplified version of an ATS system is shown. Preferably, ATS system 116 is an anonymous automatching system for equitably pricing large block trades. To minimize the ability to manipulate prices, ATS system 116 will automatch counterparties based on NBBO (National Best Bid and Offer) midpoint pricing or other pricing schemes based on the NBBO. Although not shown, ATS system 116 may be connected to external feeds that will provide NBBO pricing and other information that may be used by the system for making trades and still be within the scope of the present invention. An example of an ATS system that could incorporate the system and method of the present invention is set forth in co-pending U.S. patent application Ser. No. 12/024,050, filed Jan. 31, 2008.

Again referring to FIG. 1, generally at 100, ATS system 116 shows three Traders connected to it. These are Trader 1 at 102, Trader 2 at 106, and Trader 3 at 108. The three Traders are only meant to be representative Traders that subscribe to ATS system 116. It is understood that more or less than three Traders may be connected to, and trade on, ATS system 116 and still be within the scope of the present invention. Preferably, there will be a large number of Traders connected to the ATS system so that efficient large block trades may be carried.

Trader 1 at 102 has connected database 104 for storing Trader 1's data and information relating to his/her trading activities and holdings. Similarly, Trader 2 at 106 has connected database 108 for storing Trader 2's data and information relating to his/her trading activities and holdings. Finally, Trader 3 at 110 has connected database 112 for storing Trader 3's data and information relating to his/her trading activities and holdings.

Trader 1 at 102 is directly bi-directionally connected to ATS system 116 for carrying out trades on the ATS system. However, Trader 2 at 106 and Trader 3 at 110 are bi-directionally connected to ATS system 116 through secure Internet 114. It is understood that wired and wireless connections to the ATS system by the various Traders may exist and still be within the scope of the present invention.

As shown in FIG. 1, ATS system 116 includes database 117. Among other things, ATS database 117 includes ATS Order Book 118. ATS Order Book 118 will include the bids and offers posted for autonomous automatching by the various Traders who subscribe to the ATS system. Preferably, the bids and offers that are posted for anonymous automatching will be processed in accordance with the method described in co-pending U.S. patent application Ser. No. 12/024,050, filed Jan. 31, 2008. However, it is understood that other methods may be used for processing the bids and offers and still be within the scope of the present invention.

For convenience of understanding, but not for purpose of limitation, the bids at 120 and offers at 122 of ATS Order Book 118 are associated with entries by Traders for autonomous automatching to execute trades. Each bid entry at 120 or offer entry at 122 may include an identification code for the Trader, the security symbol, the side (bid or offer), the price, and volume to be traded. It is understood, that other information may be associated with each bid or offer to further qualify same for effecting trades and still be within the scope of the present invention. It is further understood that the bids and offers may be listed in a single list not separate lists and shall be within the scope of the present invention.

On a periodic basis, a Trader, for example, Trader 1 at 102, will in real-time balance his/her portfolio to carry out an investing strategy. The periodic basis for carrying out such real-time portfolio balancing may be at regular intervals or at Trader-specified times. By way of example, Trader 1 at 102 may set his/her system to balance the portfolio once a day at a certain time. However, it is understood that real-time portfolio balancing is not limited to once a day, it could be carried out hourly, weekly, monthly, semiannually, or annually and still be within the scope of the present invention. Moreover, Trader-specified real-time portfolio balancing can occur at varied intervals according to the Trader's investing strategy.

Figure 2:
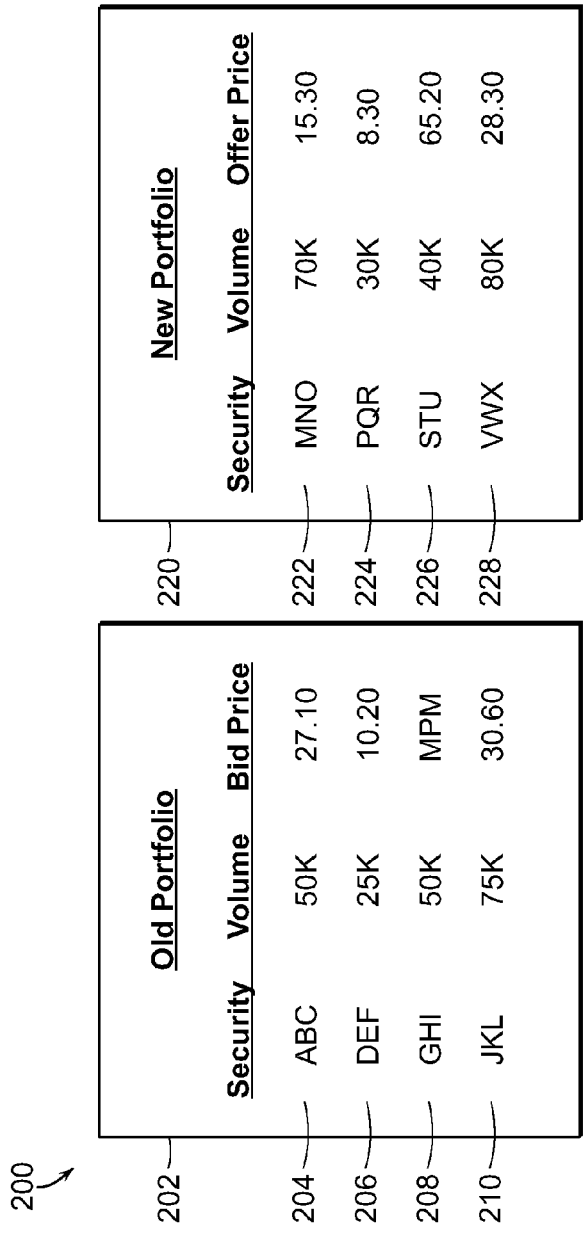
FIG. 2 shows representative listings of old and new portfolio holdings for use in describing the present invention.

Referring to FIG. 2, generally 200, listings of old and a new portfolio holdings are shown at 202 and 220, respectively; and these listings will be used for describing the present invention. At a real-time portfolio balancing event time, based on Trader 1's investing strategy, the old portfolio holdings at 202 will be transitioned to the new portfolio holdings at 220. Trader 1 will desire to effect this transition with minimum execution or legging risk. In considering "execution risk," a key risk factor is that prices may move between the time an order is initiated and executed, thus the need to suspend any other processes until all the required transactions are completed.

Referring to the old portfolio holdings at 202, for purpose of example only, Trader 1's holdings that are desired balanced include four securities. The first holding at 204 is 50,000 shares of ABC with a bid price of $27.10; the second holding at 206 is 25,000 shares of DEF with a bid price of $10.20; the third holding at 208 is 50,000 shares of GHI with a bid price of MPM; and the fourth holding at 210 is 75,000 shares of JKL with a bid price at $30.60. For purposes of the present invention, MPM refers to midpoint matching of the NBBO.

Referring to the new portfolio at 220, this is the new portfolio holding to which Trader 1 desires to transition according to his/her investing strategy at the real-time portfolio balancing event time. The new portfolio includes four new holdings. The first new holding at 222 is 70,000 shares of MNO at an offer price of $15.30; the second new holding at 224 is 30,000 shares of PQR at an offer price of $8.30; the third new holding at 226 is 40,000 shares of STU at an offer price of $65.20; and the fourth new holding at 228 is 80,000 shares of VWX at an offer price of $28.30. It is understood that Trader 1's new portfolio may include the same number of securities, or more or less than the number of securities as the old portfolio and still be within the scope of the present invention as long as the net cash constraints limitations for portfolio balancing are met.

Figure 3:
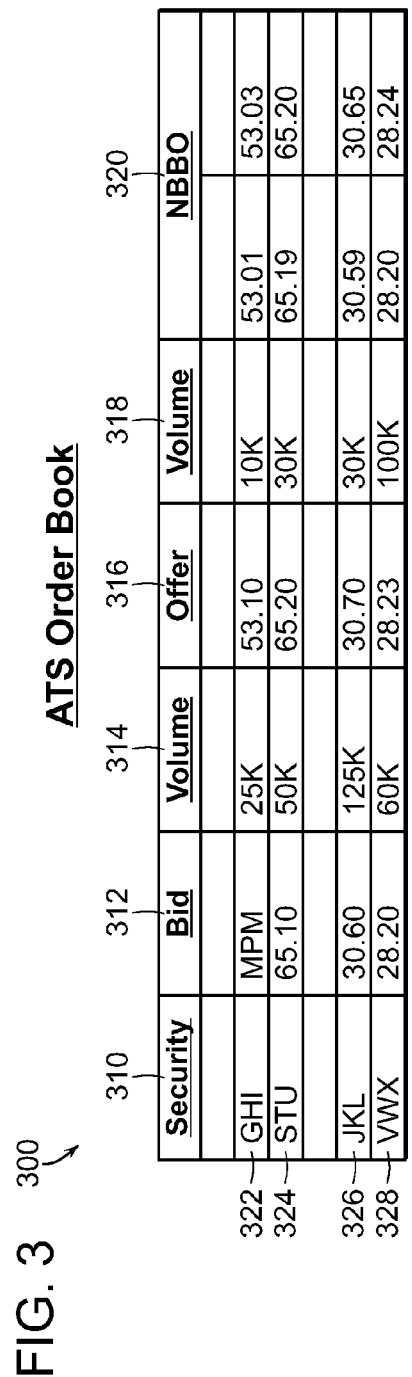
FIG. 3 shows a representative table of ATS Order Book information for use in describing the present invention.

Referring to FIGS. 2 and 3, the method of the computer-implemented system of the present invention will be described in greater detail. As set forth above, for purposes of example, Trader 1, in following his/her investing strategy at the real-time portfolio balancing event time, desires to transition the old portfolio holdings shown at 202 to the new portfolio holdings shown at 220. For purposes of describing the present invention, real-time portfolio balancing will be described with respect to Trader 1 effecting the transition of securities GHI at 208 and JKL at 210 of the old portfolio at 202 to securities STU at 226 and VWX at 228 of the new portfolio at 220, respectively. Although the transition is being specifically described with respect to two of the four securities shown in the old portfolio at 202 and the new portfolio at 220, it would be understood by a person of ordinary skill in art that the described method could be applied equally to the remainder of the securities shown in these portfolios.

Referring to FIG. 3, generally at 300, a table is shown that contains information in ATS Order Book 118 relating to two of the four transitioning transactions. In the table, the security symbols are shown at 310, the bid prices at 312, the available volumes at the bid prices at 314, the offer prices at 316, the available volumes at the offer prices at 318, and the NBBOs at 320. Information regarding security symbol GHI is shown at 322, security symbol STU at 324, security symbol JKL at 326, and security symbol VWX at 328.

At the real-time portfolio balancing event time, Trader 1 will upload to ATS system 116 the old portfolio holding information shown at 202 and the desired new portfolio holding information at 220. By way of example only, Trader 1 schedules his/her real-time portfolio balancing once a day at the beginning of the trading day so this will be his/her portfolio balancing event time. ATS system 116 will monitor ATS Order Book 117 to find trading opportunities to fit the execution requirements for effecting the transition of the old portfolio to the new portfolio. When opportunities arise, the ATS system will execute trades and in doing so will lock ATS Order Book 117 with respect to each symbol in a trade to guarantee executions, and substantially eliminate execution and legging risks.

Again referring to FIG. 3, taking first the transition of security GHI to security STU, Trader 1 wants to sell up to 50,000 shares of GHI and buy up to 40,000 shares of STU. The cash constraint for the transaction is $100,000, which would mean that in carrying out the transition it will never be net long or short more than $100,000. Thus, ATS system 116 will monitor ATS Order Book 117 to find trading opportunities to sell GHI and buy STU simultaneously, while the net value of the transaction remains less than $100,000.

Referring to FIG. 300 at 322 for security symbol GHI and at 324 for security symbol STU, it is seen that the GHI bid price is at MPM and STU offer price is at $65.20. This will mean that both symbols have pricing that is within the NBBO and, therefore, are eligible for automatching and execution. In carrying out the transaction, the value of the GHI bid at the NBBO midpoint of $53.02 is smaller than the value of the STU offer of $53.10, so the value available for purchasing STU must be determined. Accordingly, the total value of the sale of GHI will be according to Equation 1:

Shares being Sold×Share Price=Total Sale Order Value 25,000×$53.02=$1,325,500    EQ. 1

Next, the number of shares for security symbol STU must be determined based on the Total Sale Order Value determined according to Equation 1. The number of shares of STU that can be purchased will be according to Equation 2:

Total Sale Order Value÷Offer Price=Total Shares Purchased $1,325,500÷$65.20=20,329.754 Shares    EQ. 2

According to Equation 2, the number of STU shares that can be purchased is 20,329.754. This amount is rounded up to the next integer value of shares which would be 29,330 shares. The amount of the purchase will be $16 greater than the sale value of GHI shares, but the $16 amount is within the $100,000 cash limit.

At this point, ATS system 116 will have two orders to execute. The first is to buy 25,000 shares of GHI at $53.02 and sell 20,300 shares of STU at $65.20. The ATS system will execute these trades simultaneously by locking the GHI and STU order books for the period of time it takes to transact the trades. Preferably, the time period less than 1 millisecond. More preferably, it is less than 10 microseconds. And even more preferably, it will be just a few microseconds. While these order books are locked, no other orders can come in ahead of these two trades so legging risk is substantially eliminated. As indicated in the beginning of the example, Trader 1 desired to sell 50,000 shares of GHI but only 25,000 shares were available in the ATS Order Book at the portfolio balancing event time. Thus, there remains 25,000 additional shares of GHI to sell and 19,670 shares of STU to buy to complete the transition of the old portfolio to new portfolio with respect to GHI and STU.

The second transition to be described is a transition of security JKL of old portfolio at 202 to security VWX of the new portfolio at 220. With respect to these specific securities, information regarding security symbol of JKL is shown at 326 and security symbol VWX at 328.

Referring to FIG. 3, with regard to the second transition of security JKL to VWX, Trader 1 wants to sell up to 75,000 shares of JKL and buy up to 80,000 shares of VWX. Again, the cash constraint for the transaction is $100,000. ATS system 116 will monitor ATS Order Book 117 to find trading opportunities to sell JKL and buy VWX simultaneously, while the net value of the transaction remains less than $100,000.

Referring to FIG. 300 at 326 for security symbol JKL and at 328 for security symbol VWX, it is seen that both of these symbols are within the NBBO and, therefore, are eligible for anonymous automatching and execution. Specifically, the JKL bid price of $30.60 is within the NBBO of $30.59-$30.65 and the VWX offer price of $28.23 is within the NBBO of $28.20-$28.24. The value of the JKL bid at the applicable price of $30.60 is greater than the value of the VWX offer of $28.23, so the ATS system will generate an order to sell 75,000 shares of JKL at $30.60 to determine the value available for purchasing VWX shares. The total value of the sale of JKL will be according to Equation 1:

Shares being Sold×Share Price=Total Sale Order Value $75,000×$30.60=$2,295.00    EQ. 1

Next, the number of shares for security symbol VWX that can be purchased will be determined based on the Total Sale Order determined according to Equation 1. The number of shares of VWX that can be purchased will be:

Total Sale Order Value÷Offer Price=total Shares Purchased $2,295,000÷$28.23=$1,296,493 Shares    EQ. 2

According to Equation 2, the number of VWX shares that can be purchased is 81,296.493 shares. However, as indicated above, Trader 1 only desired to purchase up to 80,000 shares of VWX. As seen, the number of shares that can be purchased exceeds by 80,000, by 1,296.493 shares. This will mean the net value of the transaction will be $28.23×1296.493 which equals $36,559.957 or rounded to $39,560. This value, however, is within the $100,000 cash limit described above.

At this point in time, ATS system 116 will have two additional orders to execute. The first is to buy 75,000 shares of JKL at $30.60 and sell 80,000 shares of VWX at $28.23. The ATS system will execute these trades simultaneously by locking the JKL and VWX order books for the period of time it takes to transact the trades. As stated, it will preferably be just a few microseconds. As before, while these order books are locked, no other orders can come in ahead of these two trades so the legging risks are substantially eliminated. Different from the first transaction described above, there remain no additional trades to be made to effect the transition of security symbol JKL in the old portfolio to the security symbol VWX in a new portfolio.

It is understood that once the remaining transactions are carried out to fully transition the old portfolio at 202 to the new portfolio at 220, the real-time portfolio balancing method according to the system of the present invention will be completed until the next real-time portfolio balancing event time, either on a periodic basis or Trader-specified basis to meet the Trader's investing strategy.

The terms and expressions which are used herein are used as terms of expression and not of limitation. And, there is no intention, in the use of such terms and expressions, of excluding the equivalents of the features shown and described, or portions thereof, it being recognized that various modifications are possible in the scope of the invention.

The invention claimed is:

1. A computer-implemented method for real-time portfolio balancing and/or optimization of at least one current security of an existing portfolio of securities to a new security, comprising the steps of:
  (a) determining at a securities trader location a portfolio balancing event time;
  (b) determining in an existing portfolio of securities stored at the securities trader location at least one current security that is to be replaced with a new security;
  (c) determining at the securities trader location a new security that is to replace the current security in the existing portfolio of securities;
  (d) determining at the securities trader location a net long and short cash constraint for portfolio balancing transactions;
  (e) communicating from the securities trader location to a securities trading system at least trading information for trading up to a preferred number of shares of the current security, trading information for trading up to a preferred number of shares of the new security, and the cash constraint;
  (f) the securities trading system identifying a trade to at least in part replace the current security with the new security;
  (g) the securities trading system determining for a number of shares of the current security available for trading on the securities trading system up to the predetermined number of shares of the current security communicated at step (e) a sale value according to the number of shares of the current security available for trading on the securities trading system multiplied times a current bid price for the current security posted on the securities trading system from the securities trader location;
  (h) the securities trading system determining for a number of shares of the new security available for trading on the securities trading system up to the predetermined number of shares of the new security communicated at step (e) a number of shares of the new security that can be purchased according to the sale value determined at step (g) divided by an offer price for the new security posted on the securities trading system;
  (i) the securities trading system determining if a net value of the sale value determined at step (g) and the number of shares of the new security to be purchased according to step (h) multiplied times the offer price for the new security posted on the securities trading system is equal to or less than the cash constraint determined at step (d), and if the net value is equal to or less than the cash constraint proceeding to step (j) and if the net value is greater than the cash constraint proceeding to step (g);
  (j) the securities trading system simultaneously trading the number of shares of the current security determined at step (g) and the number of shares of the new security determined that step (h) to replace at least in part the current security with the new security in the existing portfolio of securities; and
  (k) storing at the securities trader location the existing portfolio of securities that includes at least the new security that replaced the current security.

2. The method as recited in claim 1, wherein the portfolio balancing event time includes predetermined scheduled portfolio balancing event times.

3. The method as recited in claim 2, wherein the portfolio balancing event time schedule includes hourly, daily, weekly, monthly, semiannually, or annually.

4. The method as recited in claim 1, wherein the portfolio balancing event time includes non-scheduled portfolio balancing event times.

5. The method as recited in claim 1, wherein communicating information from the securities trader location to securities trading system at step (e) includes wired and wireless communications between the securities trader location and a securities trading system.

6. The method as recited in claim 1, wherein repeating steps (g), (h), (i), (j), and (k) until up to the number of shares of the current security determined that step (e) are replaced by shares of the new security in the existing portfolio.

7. The method as recited in claim 1, wherein repeating steps (g), (h), (i), (j), and (k) until up to the number of shares of the new security determined that step (e) have replaced shares of the current security in the existing portfolio.

8. The method as recited in claim 1, wherein simultaneous trading at step (j) includes carrying out a trade in less than 1 millisecond.

9. The method as recited in claim 8, wherein simultaneous trading at step (j) includes carrying out a trade in less than 10 microseconds.

10. A computer-implemented method for real-time portfolio balancing and/or optimization of a plurality of current securities of an existing portfolio of securities to a plurality of new securities, comprising the steps of:
  (a) determining at a securities trader location a portfolio balancing event time;
  (b) determining in an existing portfolio of securities stored at the securities trader location a plurality of current securities that is to be replaced with a plurality of new securities;
  (c) determining at the securities trader location the plurality new securities that is to replace the plurality of current securities in the existing portfolio of securities;
  (d) determining at the securities trader location a net long and short cash constraint for portfolio balancing transactions;
  (e) communicating from the securities trader location to a securities trading system for each of the plurality of current securities trading information for trading up to a preferred number of shares of each of the plurality of current securities, trading information for trading up to a preferred number of shares of each of the plurality of new securities, and the cash constraint;
  (f) the securities trading system identifying trades to at least in part replace each of the plurality of current securities with a specific one of the plurality of new securities;
  (g) the securities trading system determining for each of the plurality of current securities a number of shares of that current security available for trading on the securities trading system up to the predetermined number of shares of that current security communicated at step (e) a sale value according to the number of shares of that current security available for trading on the securities trading system multiplied times a current bid price for that current security posted on the securities trading system from the securities trader location;
  (h) the securities trading system determining for each of the plurality of current securities a number of shares of the specific one of the plurality of new securities available for trading on the securities trading system up to the predetermined number of shares of that specific one of the new securities communicated at step (e) a number of shares of that specific one of the new securities that can be purchased according to the sale value determined at step (g) divided by an offer price for that specific one of the new securities posted on the securities trading system;
  (i) the securities trading system determining if a net value of the sale value determined at step (g) for each of the plurality of current securities and the number of shares of the specific one of the plurality of new securities to be purchased according to step (h) multiplied times the offer price for that specific one of the plurality of new securities posted on the securities trading system is equal to or less than the cash constraint determined at step (d), and if the net value is equal to or less than the cash constraint proceeding to step (j) and if the net value is greater than the cash constraint proceeding to step (g);
  (j) the securities trading system simultaneously trading the number of shares of each of the plurality of current securities determined at step (g) and the number of shares of the specific one of the plurality of these securities determined that step (h) to replace at least in part each of the plurality of current securities with the specific one of the plurality of new securities in the existing portfolio of securities; and
  (k) storing at the securities trader location the existing portfolio of securities that includes the plurality of new securities that replaced the plurality of current securities.

11. The method as recited in claim 10, wherein the portfolio balancing event time includes predetermined scheduled portfolio balancing event time.

12. The method as recited in claim 11, wherein the portfolio balancing event time schedule includes hourly, daily, weekly, monthly, semiannually, or annually.

13. The method as recited in claim 10, wherein the portfolio balancing event time includes non-scheduled portfolio balancing event times.

14. The method as recited in claim 10, wherein communicating information from the securities trader location to securities trading system at step (e) includes wired and wireless communications between the securities trader location and a securities trading system.

15. The method as recited in claim 10, wherein repeating steps (g), (h), (i), (j), and (k) for each of the plurality of current securities until up to the number of shares for each of the plurality of current securities determined that step (e) are replaced in the existing portfolio by shares of the specific one of the plurality of new securities.

16. The method as recited in claim 10, wherein repeating steps (g), (h), (i), (j), and (k) for each of the plurality of current securities until up to the number of shares of the specific one of the plurality of new securities determined that step (e) have replaced shares of the current security in the existing portfolio.

17. The method as recited in claim 10, wherein simultaneous trading at step (j) includes carrying out a trade in less than 1 millisecond.

18. The method as recited in claim 17, wherein simultaneous trading at step (j) includes carrying out a trade in less than 10 microseconds.

19. A computer-based system for real-time portfolio balancing and/or optimization of at least one current security of an existing portfolio of securities to a new security, comprising:
  a securities trader location for determining a portfolio balancing event time, at least one current security in an existing portfolio of securities that is to be replaced by a new security, a new security that is to replace the current security in the existing portfolio of securities, and a net long and short cash constraint for portfolio balancing transactions;
  a communications network for communicating from the securities trader location to a securities trading system trading information for trading up to a preferred number of shares of the current security, trading information for trading up to a preferred number of shares of the new security, and the cash constraint; and
  the securities trading system for identifying a trade to at least in part replace the current security with the new security, determining for a number of shares of the current security available for trading on the securities trading system up to the predetermined number of shares of the current security communicated over the communications network to the securities trading system a sale value according to the number of the current security available for trading on the securities trading system multiplied times a current bid price for the current security posted on the securities trading system from the securities trader location, determining for a number of shares of the new security available for trading on the securities trading up to the predetermined number of shares of the new security communicated over the communications network to the securities trading system a number of shares of the new security that can be purchased according to the sale value divided by an offer price for the new security posted on the securities trading system, determining if a net value of the sale value and the number of shares of the new security to be purchased multiplied times the offer price for the new security posted on the securities trading system is equal to or less than the cash constraint, and, if the net value of the sale is equal to or less than the cash constraint simultaneously trading the number of shares of the current security and the number of shares of the new security to replace at least in part the current security with the new security in the existing portfolio of securities.

20. A system as recited in claim 19, wherein the portfolio balancing event time includes predetermined scheduled portfolio balancing event times.

21. A system as recited in claim 20, wherein the portfolio balancing event time schedule includes hourly, daily, weekly, monthly, semiannually, or annually.

22. The system as recited in claim 19, wherein the portfolio balancing event time includes non-scheduled portfolio balancing event times.

23. The system as recited in claim 19, wherein the communications network includes wired or wireless networks.

24. The system as recited in claim 19, wherein simultaneous trading includes carrying out a trade in less than 1 millisecond.

25. The system as recited in claim 19, wherein simultaneous trading includes carrying out a trade in less than 10 microseconds.

* * * * *